Aug. 14, 1956 M. E. PARTIN 2,759,042

COLOR TELEVISION SYSTEM

Filed Sept. 25, 1953 3 Sheets-Sheet 1

INVENTOR.
MELVIN E. PARTIN
BY
Dean V. Hayterine
ATTORNEY.

Aug. 14, 1956 M. E. PARTIN 2,759,042

COLOR TELEVISION SYSTEM

Filed Sept. 25, 1953 3 Sheets-Sheet 2

INVENTOR.
MELVIN E. PARTIN
BY
[signature]
ATTORNEY

Aug. 14, 1956 M. E. PARTIN 2,759,042

COLOR TELEVISION SYSTEM

Filed Sept. 25, 1953 3 Sheets-Sheet 3

INVENTOR.
MELVIN E. PARTIN
BY
Allen V. Hazeltine
ATTORNEY

United States Patent Office 2,759,042
Patented Aug. 14, 1956

2,759,042

COLOR TELEVISION SYSTEM

Melvin E. Partin, Philadelphia, Pa., assignor to Philco Corporation, Philadelphia, Pa., a corporation of Pennsylvania Application September 25, 1953, Serial No. 382,384

20 Claims. (Cl. 178—5.4)

The present invention relates to electrical systems and more particularly to cathode-ray tube systems comprising a beam intercepting structure and indexing means arranged in cooperative relationship with the beam intercepting structure and adapted to produce a signal indicative of the position of the cathode-ray beam. This application is a continuation-in-part of my application Serial No. 329,809, filed January 6, 1953.

The invention is particularly adapted for, and will be described in connection with, a color television image presentation system utilizing a single cathode-ray tube having a beam intercepting, image forming screen member comprising vertical stripes of luminescent materials. These stripes are preferably arranged in laterally-displaced color triplets, each triplet comprising three vertical phosphor stripes which respond to electron impingement to produce light of the different primary colors. The order of arrangement of the stripes may be such that the normal horizontally-scanning cathode-ray beam produces red, green and blue light successively. From a color television receiver there may then be supplied a video signal wave having signal components definitive of the brightness and chromaticity of the image to be reproduced, which wave is utilized to control the intensity of the cathode-ray beam to the required instantaneous value as the beam scans the phosphor stripes.

The video color wave may be generated at the transmitter by means of appropriate camera units producing three signals indicative of three color-specifying parameters of successively scanned elements of a televised scene. These three signals are preferably such as to specify the color of the image elements with respect to three imaginary color primaries "X," "Y" and "Z" as defined by the International Commission on Illumination (ICI). With this choice of primaries, the Y signal represents the brightness of the image elements as perceived by the human eye, while the X and Z signals contain the remaining intelligence as to color of the image elements. Since the specification of any color in terms of any given set of primaries may be converted to a specification of the same color in terms of any other set of primaries by means of linear transformations, the transmission of the X, Y, and Z signals makes available at the receiver all of the required information necessary to excite the three real primary-color sources of the image reproducing cathode-ray tube.

In a preferred arrangement for segregating and apportioning the intelligence concerning the X, Y, and Z components of the color of the image elements at the transmitter, these components are combined to form two difference signals (X–Y) and (Z–Y) which are transmitted in different phase relations as amplitude-modulation of a subcarrier signal. The Y signal is then transmitted in the frequency band located below that of the modulated subcarrier. The modulation of the subcarrier is preferably effected by means of balanced modulators, so that no subcarrier signal is generated when the difference signals (X–Y) and (Z–Y) are zero, i. e. when image elements which are white or gray are scanned. However, when colored image elements are scanned, either or both of the difference signals (X–Y) and (Z–Y) will differ from zero, producing a subcarrier signal having a phase determined by the relative values of the difference signals and hence by the hue of the image, and an amplitude determined by the absolute values of the difference signals and hence by the saturation of the image color. The modulated subcarrier signal therefore may be considered a chromaticity signal having a phase and amplitude representative of the hue and saturation respectively, of the color of the image elements.

The instantaneous amplitude of the video signal will be a function of the magnitudes of the three components thereof and of the absolute phase positions of the two components constituting the modulated subcarrier signal, and at any given instant the amplitude is indicative of the intensity of one of the primary color constituents of an element of the image to be reproduced. For proper color rendition, it is required that, as the phosphor stripes producing a given one of the primary colors of light of a particular image element is impinged by the cathode-ray beam, the intensity of the beam be simultaneously controlled in response to the contemporaneous value of the video signal representing the corresponding color component of the televised image.

Such a synchronous relationship may be maintained throughout the scanning cycle by deriving an indexing signal indicative of the instantaneous position of the cathode-ray beam upon the image-forming screen, and by utilizing this signal to control the relative phase of the video wave. The said indexing signal may be derived from a plurality of beam responsive signal generating regions of the beam intercepting screen structure, which regions are arranged in a geometric configuration indicative of the geometric configuration of the phosphor stripes, so that, when the beam scans the screen, the indexing regions are excited in spaced time sequence relative to the scanning of the color triplets and the desired indexing signal is generated in a suitable output electrode system of the cathode-ray tube.

In one form, the indexing regions may be constituted by a layer of a material adapted to exhibit secondary electron emissive properties at specified stripe portions thereof different from the secondary emissive properties at other portions thereof. Such differences in secondary electron emissivities may be attained by an underlying layer exhibiting at corresponding portions different values of resistance to electron flow as disclosed and claimed in the copending application of William E. Bradley and Meier Sadowsky, Serial No. 313,018, filed October 3, 1952.

In another form, the indexing regions may be in the form of stripes of a material having secondary-emissive properties which differ from the secondary-emissive properties of the remaining portions of the beam intercepting structure. For example, such indexing portions may consist of stripes of a high atomic number material such as gold, platinum or tungsten or may consist of certain oxides such as cesium oxide or magnesium oxide. Alternatively, the indexing regions may consist of stripes of a fluorescent material, such as zinc oxide, having a spectral output in the non-visible light region and the indexing signals may be derived from a suitable photoelectric cell arranged, for example, in a side wall portion of the cathode-ray tube out of the path of the cathode-ray beam and facing the beam intercepting surface of the screen structure.

To achieve a desired degree of definition comparable to that commonly available in so-called black-and-white image reproducers, the image reproducing screen of the cathode-ray tube should contain a relatively large number of groups of phosphor stripes. In the case of a cathode-ray tube screen constituted by vertically arranged color triplets, the number of triplets should correspond to the number of picture elements contained in one line scan of the reproduced image, and, in a typical case, there may be approximately 400 to 450 color triplets arranged on the screen surface of the cathode-ray tube.

As a general rule, the rate at which the beam scans the phosphor stripes and the associated indexing portions can be maintained constant only within certain tolerance values. This is due to the fact that the phosphor stripes and the indexing portions are normally arranged on the screen surface with only a certain degree of precision dictated by economic considerations and manufacturing tolerances so that a non-uniform distribution of these components on the screen surface can normally be expected. Furthermore, in order to achieve a uniform scanning velocity, it is necessary that the beam deflection signal conform absolutely to a preestablished waveform determined by the geometry of the tube. In this connection, it will be noted that, when the cathode-ray tube is sufficiently long and/or has a sufficiently small screen area so that the normally aspheroidal screen surface is in effect concentric to the effective deflection center of the scanning beam, the deflecting signal must exhibit a linearly varying amplitude. When the screen has approximately 400 color triplets arranged thereon, this linearity must be held to a tolerance of the order of one part in 12,000 to achieve faithful color reproduction. In practice, this problem is much more severe because, desirably, the cathode-ray tube is made relatively short and/or has a large screen area so that the aspheroidal surface of the screen departs considerably from concentricity to the effective deflection center of the beam. In this case, the deflection of the beam at constant velocity over the surface of the screen requires a deflection signal having a more complex waveform, and the difficulty of generating such a signal within the necessary close tolerance value is correspondingly increased.

The departure from constant velocity as the beam scans the screen structure produces a corresponding change in the frequency of the indexing signal produced by the screen structure.

In the copending application of E. M. Creamer, Jr., et al., Serial No. 240,324, filed August 4, 1951, there have been described systems by means of which the desired indexing information can be obtained from the screen structure in a readily usable form. More particularly, and in accordance with the principles set forth in the said copending application, use is made of the finding that the scanning of the indexing regions by the electron beam produces, in the collector circuit of the cathode-ray tube, signal components which represent modulation products as determined by the intensity variations of the beam and the rate of scanning the indexing regions. Accordingly, by additionally varying the intensity of the beam at a pilot carrier rate widely different from the rate at which the beam intensity is varied by the video signal, an output signal is produced in the collector electrode of the cathode-ray tube comprising, as one component, modulation products proportional to the pilot carrier frequency and the rate of scanning the indexing regions. Because the frequencies of these modulation products are widely different from the frequencies of any modulation products brought about by the video signal variations of the beam, the former may be separated from the latter by suitable frequency discriminating means. These pilot carrier modulation products consist essentially of a carrier wave at the pilot carrier frequency, and sideband signals representing the sum and difference of the pilot carrier frequency and the rate of scanning the indexing regions. Since changes in the rate of scanning the indexing regions will be indicated by a change in the frequencies of the sideband signals, the separated signal or one of its sidebands may be used as an indexing signal.

The indexing signal, generated by the action of the scanning beam on the screen structure, is a low intensity signal and must be appropriately amplified to make it suitable for controlling the phase of the video signal applied to the beam intensity controlling system in the desired synchronous relationship to the position of the scanning beam. In addition, it is desirable to filter and limit the generated indexing signal to separate it from undesired components also generated at the screen structure by the scanning beam. The selective circuits commonly available for these purposes generally apply a phase shift to the indexing signal which varies as a function of the frequency thereof so that the processed indexing information may no longer have the same form as the generated indexing information for all frequency values of the generated signal. In some instances, these undesired phase variations of the processed indexing signal may be sufficient to produce a serious error of color synchronization between the position of the beam and the contemporaneous value of the color video signal applied to the intensity control system of the cathode-ray tube.

It is an object of the invention to provide improved cathode-ray tube systems of the type in which the position of an electron beam on a beam intercepting screen structure is indicated by an indexing signal derived from an indexing component of the screen structure.

Another object of the invention is to provide improved cathode-ray tube systems in which undesired phase variations of the indexing signal normally produced in processing the indexing signal are obviated.

A further object of the invention is to provide an improved index signal producing system for cathode-ray tubes, in which system phase variations of the indexing signal normally produced in the processing of the indexing signal may be compensated to any desired degree.

Another object of the invention is to provide a color television cathode-ray producing system in which accurate color rendition is achieved notwithstanding non-uniformities of the distribution and of the scanning of the color reproducing elements of the image screen of the cathode-ray tube.

Further objects of the invention will appear as the specification progresses.

In accordance with the invention, in a cathode-ray tube system adapted to generate an indexing signal comprising modulation products which are determined by the frequency of a pilot carrier signal varying the intensity of the cathode-ray beam and by the rate of scanning indexing regions of the beam intercepting structure, and which are indicative of the position of the beam, the foregoing objects are achieved by varying the frequency or phase of the pilot carrier signal applied to the cathode-ray beam in synchronism with the frequency variations normally produced by the variations of the scanning rate of the indexing regions of the screen structure. In accordance with one embodiment of the invention, the pilot carrier signal is frequency modulated in a sense such as to maintain one of the sideband components of the generated indexing signal at a substantially constant frequency value. This sideband component is preferentially selected to the exclusion of the remaining signal components and serves as the source of the desired indexing information. Since the selected sideband is thus made to exhibit a substantially constant frequency value, the subsequent processing thereof by the selective circuits of the indexing system may be effected without imparting undesirable phase variations to the index information.

In one form of this embodiment of the invention, frequency modulation of the pilot carrier signal is effected by means of a control signal having a polarity and amplitude as determined by departures of the frequency of the indexing signal from a preestablished frequency value. In another form of this embodiment of the invention, frequency modulation of the pilot carrier signal is effected by means of a control signal having a polarity and amplitude as determined by departures of the phase of the indexing signal from the phase of a reference signal having a frequency equal to the desired predetermined frequency value of the indexing signal.

In accordance with a second embodiment of the invention, the pilot carrier signal is phase modulated in a sense such that the corresponding phase variations imparted to the selected sideband component by the phase modulated pilot carrier compensate, to the desired degree, the undesirable phase variations imparted to the selected sideband component by the selective circuits.

The invention will be described in greater detail with reference to the appended drawings forming part of the specification and in which.

Figure 1:
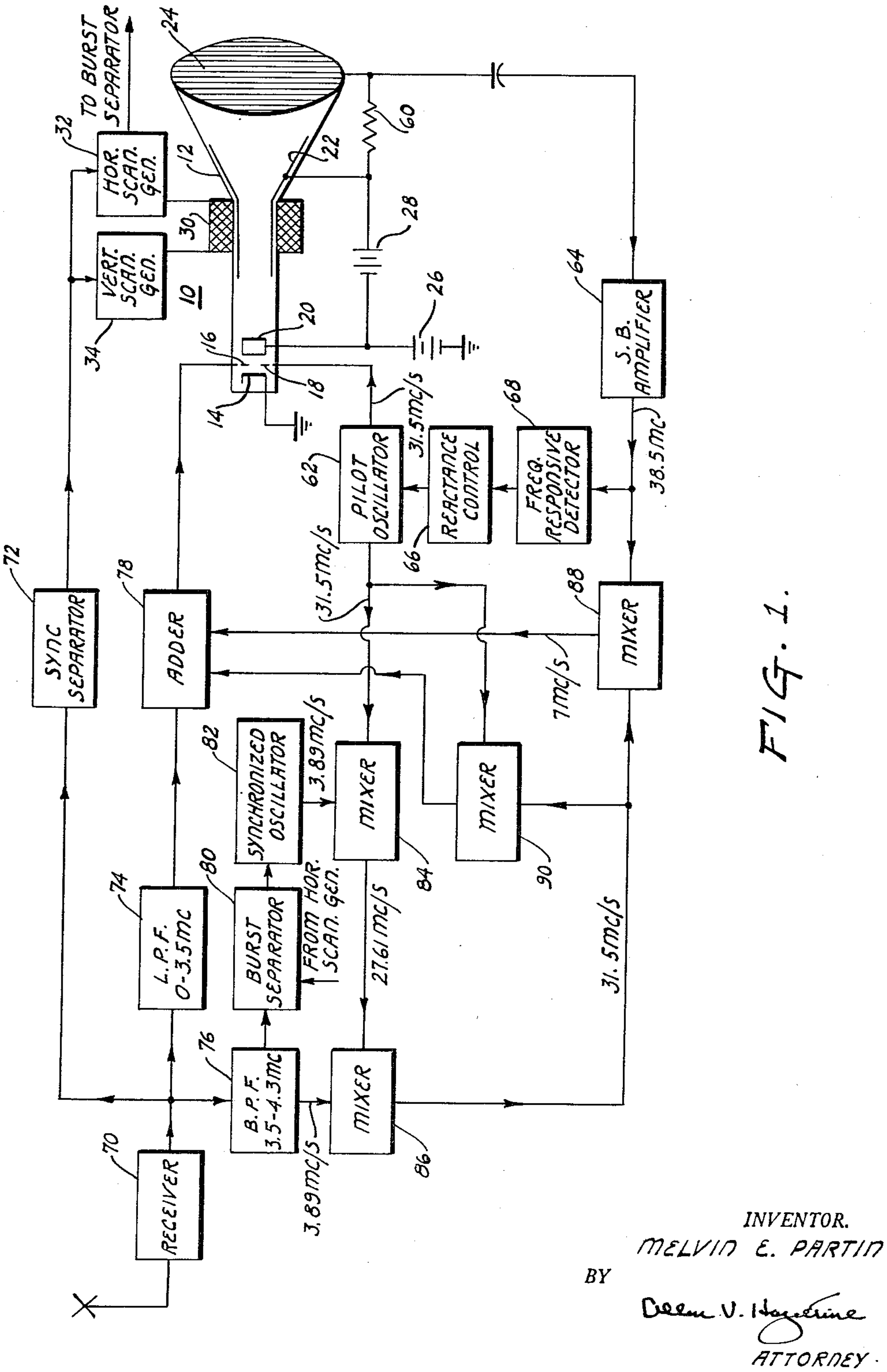
Figure 1 is a block diagram, partly schematic, showing one embodiment of a cathode-ray tube system in accordance with the invention.

Referring to Figure 1, the cathode-ray tube system there shown comprises a cathode-ray tube 10 containing within an evacuated envelope 12, a dual beam generating and intensity control system comprising a cathode 14, control electrodes 16 and 18, a focusing anode 20 and an accelerating anode 22, the latter of which may consist of a conductive coating on the inner wall of the envelope and terminates at a point spaced from the end face 24 of the tube in conformity with well established practice. Suitable forms of construction for the dual beam generating system have been described in my copending application, Serial No. 242,264, filed August 17, 1951, and a further description thereof herein is believed to be unnecessary. Electrodes 20 and 22 are maintained at their desired operating potentials by suitable voltage sources shown as batteries 26 and 28, the battery 26 having its positive pole connected to the anode 20 and its negative pole connected to a point at ground potential, and the battery 28 being connected with its positive pole to electrode 22 and its negative pole to the positive pole of battery 26.

A deflection yoke 30 coupled to horizontal and vertical deflection signal generators 32 and 34 respectively, of conventional design, is provided for deflecting the dual electron beams across the face plate 24 of the tube to form a raster thereon.

Figure 2:
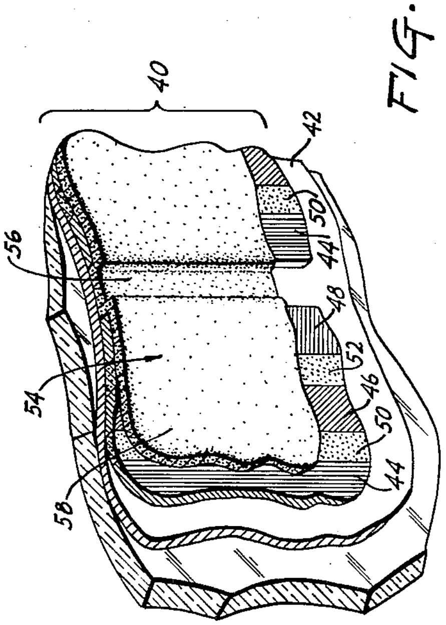
Figure 2 is a perspective view of a portion of one form of an image reproducing screen structure suitable for the cathode-ray tube system of the invention.

The end face plate 24 of the tube 10 is provided with a beam intercepting structure 40, one suitable form of which is shown in Figure 2. In the arrangement shown in Figure 2, the structure 40 is formed directly on the face plate 24. However, it should be well understood that the structure 40 may be formed on a suitable light transparent base which is independent of the face plate 24 and may be spaced therefrom. The face plate 24 is provided with a light transparent electrically conductive coating 42 which may be a coating of stannic oxide or of a metal such as silver, having a thickness only sufficient to achieve the desired conductivity. Superimposed on the coating 42 are a plurality of parallelly arranged stripes 44, 46 and 48 of phosphor materials which, upon impingement of the cathode-ray beam, fluoresce to produce light of three different primary colors. For example, the stripe 44 may consist of a phosphor such as zinc phosphate containing manganese as an activator, which upon electron impingement produces red light, the stripe 46 may consist of a phosphor such as zinc orthosilicate, which produces green light, and the stripe 48 may consist of a phosphor such as calcium magnesium silicate containing titanium as an activator, which produces blue light. Other suitable materials which may be used to form the phosphor stripes 44, 46 and 48 are well known to those skilled in the art, as well as methods of applying the same to the face plate 24, and further details concerning the same are believed to be unnecessary.

Each of the groups of stripes may be termed a color triplet, and the sequence of the stripes is repeated in consecutive order over the area of the structure 40.

The desired indexing signal is generated in the manner described and claimed in the above mentioned copending application of William E. Bradley and Meier Sadowsky. More particularly, and in accordance with one arrangement described in said copending application, the phosphor stripes 44, 46 and 48 are arranged in spaced relationship as shown in Figure 2 and the spacing between stripes 44—46 and between 46—48 are filled with an electrically insulating material such as unactivated willemite, the said stripes so formed being shown as 50 and 52 respectively. Arranged over the stripes 44, 46, 48, 50 and 52 and in contact with the coating 42 at the spaces between the stripes 44 and 48 is a coating 54 of a material adapted to exhibit different secondary emissive properties as determined by the resistance to electron flow of the underlying layer. Such a material may be magnesium oxide, which, in the construction shown, exhibits at its portions 56 in contact with the conductive layer 42 a secondary electron emissivity different from that exhibited by its portions 58 overlying the stripes 46, 48, 50 and 52.

The beam intercepting structure so constituted is connected to the positive pole of battery 28 through a load impedance 60 (see Figure 1) by means of a suitable connection to the conductive coating 42 thereof.

Since the dual cathode-ray beams are deflected by the common deflection yoke 30, they simultaneously scan the beam intercepting structure 40, and indexing information derived from one of the beams may be used to establish the position of the other beam. When, in accordance with the principles set forth in the above-mentioned application of E. M. Creamer, Jr., et al., one of the beams, such as the beam under the control of the electrode 18, is varied in intensity at a pilot frequency, for example by means of a pilot oscillator 62, the so varied beam will generate across the load resistor 60 an indexing signal comprising a carrier component at the pilot frequency and sideband components representing the sum and difference frequencies of the pilot frequency and the rate at which the indexing stripe regions 56 are scanned by the beam.

In a typical case, the pilot frequency variations of the intensity of the beam may occur at a nominal frequency of 31.5 mc./sec. and, when the rate of scanning the indexing regions 56 of the coating 54 (see Figure 2) is nominally 7 million per second as determined by the horizontal scanning rate and the number of indexing regions 56 impinged per scanning period, a modulated signal at a nominal frequency of 31.5 mc./sec., and having first order sideband components nominally at 24.5 mc./sec. and 38.5 mc./sec., is produced across the load resistor 52. Changes in the rate of scanning the indexing regions due to non-linearities of the beam deflection and/or non-uniformities of the spacing of the indexing regions produce corresponding changes in the frequencies of the sideband components about their respective nominal values so that one of the sidebands may be used as a source of indexing information. In the arrangement specifically shown in Figure 1, the upper sideband component, i. e. the sideband component at approximately 38.5 mc./sec., is used as the source of indexing information and this sideband signal is preferentially selected from the other components generated across load impedance 60 by means of an amplifier 64 having a restricted pass band characteristic centered about the nominal frequency of the selected signal.

Because of the relatively narrow bandwidth of the amplifier 64, the signal processed thereby is subjected to phase variations the extent of which are determined by the frequency deviations of the processed signal. In some instances, these phase variations imparted to the indexing information may be sufficient to produce a serious error of color synchronization between the position of the beam on the screen structure and the contemporaneous value of the color video signal applied to the intensity control system of the cathode-ray tube.

In accordance with the embodiment of the invention shown in Figure 1 these undesirable phase variations are avoided by frequency modulating the pilot oscillator 62 in a sense such as to maintain the frequency of the sideband component selected by amplifier 64 at a substantially constant frequency value. For this purpose, the pilot oscillator 62 is constructed as a variable frequency oscillator and is provided with a signal responsive variable reactance control element 66 adapted to vary its frequency about the central value thereof as determined by a control signal applied to the reactance control 66.

In a typical form, the oscillator 62 may comprise a thermionic discharge tube having its input and output electrodes coupled together in regenerative feedback relationship by means of a resonant circuit tuned to the nominal operating frequency of the oscillator i. e. tuned to 31.5 mc./sec. The reactance control 66 may take any of well known forms and may consist for example, of a Miller type reactance tube shunting the tuned circuit of oscillator 62 and adapted to vary the resonant frequency thereof as determined by the amplitude of a control voltage applied to the input electrode of the reactance tube.

For actuating the reactance control 66 there is provided a frequency responsive detector 68 adapted to produce a control signal having an amplitude and phase as determined by the deviations of the frequency of the signal at the output of amplifier 24 from its assigned nominal frequency. Detector 68 may be of well known form and may consist, for example, of a Foster-Seeley type frequency discriminator having its cross-over frequency equal to the nominal frequency of the selected sideband signal.

The system operates to maintain the frequency of the sideband signal selected by the amplifier 64 at a substantially constant value. More particularly, a change in the scanning rate of the indexing regions, normally tending to increase the frequency of the sideband signal selected and processed by the amplifier 64, brings about a corresponding decrease of the frequency of the oscillator 62 through the intermediary of the reactance control 66 coupled to the oscillator and the frequency responsive detector 68 coupled to the control 66 and the amplifier 64. Since the signal processed by the amplifier 64 is thus maintained at a substantially constant frequency value substantially no phase variations are imparted to the processed indexing information notwithstanding the phase versus frequency characteristic of the amplifier and the variations of the rate of scanning of the indexing regions of the beam intercepting structure of the tube 10.

It will be noted that, whereas the signal derived from the amplifier 64 is maintained at a substantially constant frequency value by means of the control systems 66 and 68, the oscillator 62 nevertheless undergoes variations in its frequency value as determined by variations of the scanning rate of the indexing regions. Therefore the desired indexing information is effectively transferred to the oscillator 62 by the frequency control system in the form of frequency variations of the oscillator frequency about its nominal frequency value, and accordingly a signal derived from the oscillator may be used for establishing the desired time phase position of the video wave applied to the cathode-ray tube.

The indexing information contained in the signal from oscillator 62 may be used for establishing the time phase position of the video wave in any of several manners. In a typical arrangement the indexing information may be combined with the video signal in a mixer system of the type shown in Figure 1. More particularly, for supplying a color video wave to the control grid 16 of cathode-ray tube 10 there is provided a receiver 70 which may be of conventional design and may include the usual radio frequency amplifier, frequency conversion and detector stages for producing a color video signal.

In a typical form, the color video signal comprises time-spaced horizontal and vertical synchronizing pulses recurrent at the horizontal and vertical scanning frequencies, and the color video wave occurring in the intervals between the horizontal pulses. The incoming video signal may further include a marker signal for providing a phase reference for the color establishing component of the color video wave, such a marker signal being usually in the form of a burst of a small number of cycles of carrier signal having a frequency equal to the frequency of the chromaticity subcarrier component of the video wave and occurring during the so-called back porch interval of the horizontal scanning pulses.

The synchronizing pulses contained in the received video signal are selected by a sync signal separator 72 of conventional form and subsequently energize, in well known manner, the horizontal and vertical scanning generators 32 and 34.

The video color wave is separated into its two components by means of a low pass filter 74 and a bandpass filter 76, whereby at the output of filter 74 there is derived the low frequency component of the video wave containing the brightness information of the image and at the output of the filter 76 there is derived the modulated subcarrier component of the video wave indicative of the chromaticity information of the image and the marker signal. The frequency pass bands of the filters 74 and 76 are selected in conformity with the standards of the transmission system, and a typical value for the pass band of filter 74 is 0 to 3.5 mc./sec. and for the filter 76 is 3.5 to 4.3 mc./sec. when the subcarrier frequency of approximately 3.89 mc./sec. is used at the transmitter.

The brightness signal is supplied to the control grid 16 of the tube 10 through an adder 78 having a plurality of inputs and a common output and consisting, in a typical case, of a plurality of thermionic tubes, the input grid circuits of which are separately energized by the respective input signals applied to the adder, and the output anode circuits of which are supplied through a common load impedance.

The marker signal is separated from the video wave by means of a gated path operated in synchronism with the occurrence of the marker signal. For this purpose there is provided a burst separator 80 consisting, for example, of a dual grid thermionic tube having one control grid which is coupled to the output of the bandpass filter 76, and a second control grid so negatively biased as normally to prevent conduction through the tube. The tube is made conductive at the proper instant, i. e., during the back porch interval of the horizontal synchronizing pulses, by means of a positive pulse which may be derived from the output of the horizontal scanning generator 32 in well known manner, and which is applied to the said second control grid to override the normal blocking bias. The burst separator may also contain a filter for attenuating undesirable signals at the output thereof, i. e., the separator may contain a resonant circuit which is tuned to the frequency of the marker signal and which is connected to the anode of the tube.

The marker signal so provided is applied to an oscillator 82 which is adapted to generate a signal having a frequency and a phase position as established by the frequency and phase position of the marker signal applied to the input thereof. In a suitable form the oscillator 82 may be of the type described in the copending application of Joseph C. Tellier, Serial No. 197,551, filed November 25, 1950.

The chromaticity information, in proper phase as determined by the marker signal and by the indexing information, is supplied to the electrode 16 by means of a heterodyne mixer 84 having one input supplied by the oscillator 82 and a second input supplied by the pilot oscillator 62, a second mixer 82 having one input supplied by the bandpass filter 76 and a second input supplied by the mixer 84, and a third mixer 88 having one input supplied by the output of mixer 86 and a second input supplied by the amplifier 64. The heterodyne mixers 84, 86 and 88 may be of conventional form and may each consist of a dual grid thermionic tube, to the different grids of which the two input signals are supplied. The mixers may also contain an output circuit broadly tuned to the frequency of the desired output signal, whereby the desired heterodyne frequency signal may be preferentially selected.

The system operates to combine the marker signal at 3.89 mc./sec. with the pilot carrier signal at a nominal frequency of 31.5 mc./sec. to produce a first heterodyne signal at a frequency of approximately 27.61 mc./sec. This heterodyne signal, it will be noted, exhibits, about a fixed phase reference established by the marker signal, frequency variations as determined by variations of the scanning rate of the indexing regions of beam intercepting of the tube 10 which produce corresponding variations of the frequency of oscillator 62 as previously described.

By means of the mixer 86 this heterodyne signal is in turn combined with the chromaticity information existing at a subcarrier frequency of approximately 3.89 mc./sec. to produce a second heterodyne signal at 31.5 mc./sec. which signal exhibits the phase and amplitude variations of the chromaticity signal and the frequency variations established by the variations of the scanning rate of the indexing regions and hence of the color triplets of the screen, these variations being established with reference to a given time phase position as determined by the color marker signal energizing the oscillator 82.

The 31.5 mc./sec. signal so produced is in turn adapted to the requirements of the color image screen of the tube 10 by means of the mixer 88 to which there is also supplied a signal at 38.5 mc./sec. derived from the output of amplifier 64. The so combined signals produce at the output of the mixer 88 a signal at 7 mc./sec. exhibiting the amplitude, phase and frequency variations of the signal from the mixer 86 so that the time phase position of this signal, as well as the nominal frequency of the color information contained therein, is in conformity to the requirements of the image screen of the tube 10.

When the information at the output of the low pass filter 74, and the chromaticity information appearing on the color subcarrier derived from bandpass filter 76, are in terms of the imaginary color primaries X, Y and Z, as takes place in the preferred receiving system above specifically described, it may be necessary to modify these signals to make them conform to the particular real primary colors, R, G and B characterizing the phosphor stripes utilized in the screen assembly 40 (see Figure 2) of the cathode-ray tube. This may be accomplished by synchronously detecting a signal having the color information at a particular phase and adding the detection products in proper relative amounts to the imaginary color primary signals in the adder 78. In Figure 1 this is accomplished by a heterodyne mixer 90 to which are applied the signal at the output of mixer 86 and a signal from the pilot oscillator 62. The mixer 90, which may consist of a dual grid tube as in the case of the mixers previously described, may include a conventional phase shifter for either or both of the input signals thereof to vary the relative phases of the signals, and may further include an amplifier in the output circuit to establish the amplitude of the input signal at the proper value relative to the amplitudes of the signals supplied to the adder 78 from the low pass filter 74 and from the mixer 88. As will be apparent to those skilled in the art, the actual value of the phase shift and the amplification which takes place in the mixer 90 are determined by the particular primary colors produced by the cathode-ray tube 10, and these quantities may be readily calculated.

Figure 3:
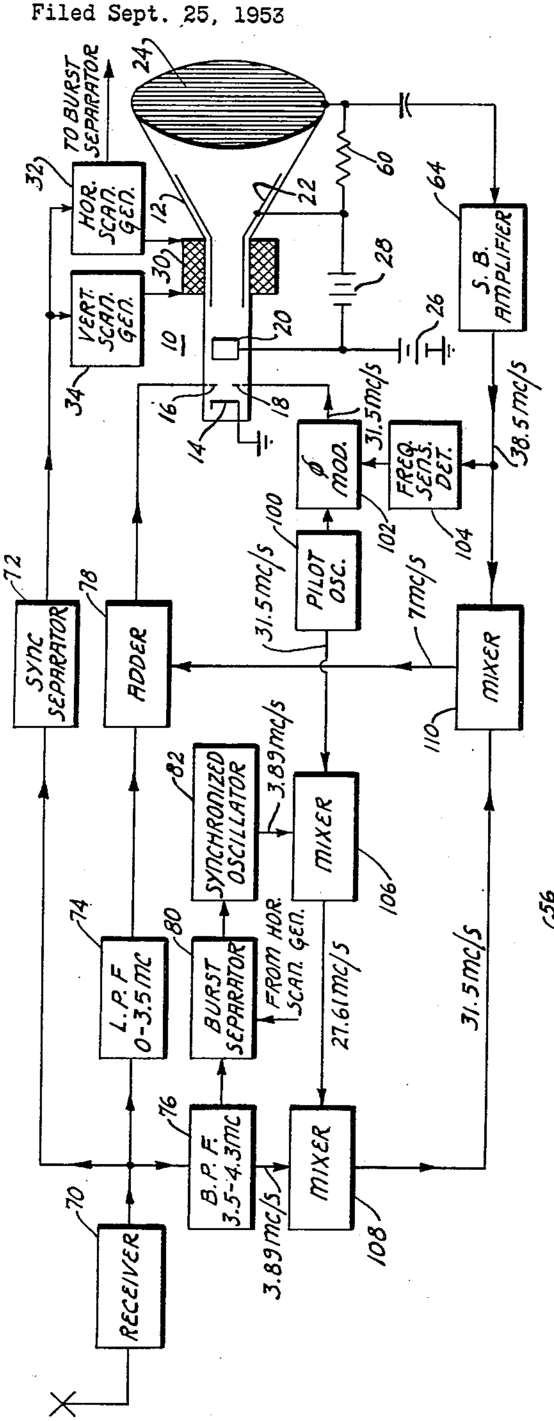
Figure 3 is a block diagram, partly schematic, showing another embodiment of a cathode-ray tube system in accordance with the invention.

Figure 3 illustrates a second embodiment of the system of the invention in which undesired phase variations, normally imparted to the signal processed by the frequency selective amplifier, are cancelled by an opposing phase shift imparted to the selected signal by appropriately phase varying the pilot carrier signal supplied to the image tube. As will be noted, many of the components of the system shown are similar to the components of the system of Figure 1, and accordingly these components have been indicated by the same reference numerals. In the system shown in Figure 3, the televised image is reproduced by means of a cathode-ray tube 10 similar to that above described and comprising a cathode 14, control electrodes 16 and 18, a focusing electrode 20, an accelerating electrode 22, and a faceplate 24 carrying a beam intercepting screen structure which may be of the form shown in Figure 2. Suitable sources 26 and 28 are supplied for energizing the electrodes, the beam intercepting screen structure being connected to the source 28 through a load resistance 60 as previously described. A horizontal and vertical deflecting yoke 30, energized by horizontal and vertical scanning generators 32 and 34, is similarly supplied for deflecting the beams of the cathode-ray tube to form a raster on the beam intercepting structure.

Indexing information is derived from the tube 10 in the form of a sideband component of the intermodulation products produced by a pilot carrier signal which is supplied to the control electrode 18 from a pilot oscillator 100 through a phase modulator 102 to be referred to later in greater detail.

Typically the pilot oscillator 100 operates at a frequency of 31.5 mc./sec., and, when the rate of scanning the index stripe regions of the tube is 7 million per second, there is produced across the load impedance 60 a carrier wave at a frequency of 31.5 mc./sec. together with upper and lower sideband components having nominal frequencies of 38.5 mc./sec. and 24.5 mc./sec., and frequency deviations about the nominal frequency values as determined by variations of the scanning rate due to nonlinearities of the beam deflection and/or non-uniformities of the spacing of the index stripe regions. The sideband at approximately 38.5 mc./sec. may be selectively derived from the output of the tube 10 by an amplifier 64 and serves as a source of the desired indexing information.

In accordance with the embodiment of the invention shown in Figure 3, the undesirable phase variations of the signal processed by the amplifier 64, which are normally brought about by the restricted pass band characteristic of the amplifier, are compensated by applying counteracting phase variations to the signal generated by the tube 10. For this purpose there is coupled to the output of amplifier 64 a frequency sensitive detector 104 adapted to produce a control signal having amplitude variations as determined by the frequency deviations of the selected sideband signal about its nominal frequency value and by the sensitivity of the detector 104. The control signal so produced energizes the phase modulator 102 and thereby phase modulates the pilot carrier signal supplied to control electrode 18, which action in turn produces corresponding phase modulation of the sideband components generated by the indexing structure of the tube 10. The extent of the phase modulation of the sideband components may be adjusted to any desired degree by appropriately adjusting the sensitivity of the phase modulator 102 so that it is possible to produce a counteracting phase variation of the selected sideband compensating not only the phase variations produced by amplifier 64 but also phase variations which may occur in the processing of the indexing information subsequent to the amplifier 64.

The phase modulator 102 may be of conventional form and may consist, for example, of an inductance-capacitance circuit which is resonant to the frequency of the pilot carrier signal, and a reactance tube shunting the tuned circuit which is adapted to vary its resonant frequency as a function of the amplitude of a control signal applied to the grid of the reactance tube. For achieving larger phase shifts, the phase modulator 102 may be of the type described by E. Labin in U. S. Patent No. 2,372,210 dated March 27, 1945, wherein variations of the transit time of an electron beam between a point of origin of the beam and a target electrode, as determined by the amplitude of a control potential, serve to produce corresponding phase variations of an input signal.

The frequency sensitive detector 104 may be of conventional form and may consist of a Foster-Seeley type discriminator similar to the detector 68 of the system of Figure 1.

The output signal of amplifier 64 contains the desired indexing information in the form of frequency variations about the nominal frequency value of the signal and may thus be used to establish the time phase position of the color video wave applied to the control electrode 16 of the cathode-ray tube 10. In the arrangement shown in Figure 3 this is effected by a mixer system, by means of which the color information and indexing information are combined to produce a wave adapted to the requirements of the image screen of the tube 10. More particularly, and as in the case of the system shown in Figure 1, the video color wave, comprising a brightness component in the form of a wave having a bandwidth of the order of 0–3.5 mc./sec. and comprising a chromaticity component in the form of a subcarrier wave having a nominal frequency of approximately 3.89 mc./sec. and having additionally a color phase marker signal at a frequency of 3.89 mc./sec., may be derived from a receiver 70. The brightness component is selected by means of a low pass filter 74 and supplied to the control electrode 16 through an adder 78. The chromaticity component and the color phase marker signal may be derived from the output of receiver 70 by means of a bandpass filter 76. The color phase marker signal derived from the output of bandpass filter 76 is supplied to a burst separator 80 and a synchronized oscillator 82, as previously described, and is thereafter combined in a mixer 106 with a signal from the pilot oscillator 100 to produce a first heterodyne signal having a phase reference as established by the color phase marker signal. This heterodyne signal is in turn combined with the chromaticity component of the image signal by means of a heterodyne mixer 108 to produce a second heterodyne signal having amplitude and phase variations as determined by the chromaticity component, and having a phase reference as determined by the color phase marker signal. The output signal of mixer 108 is modified by the indexing information, and adapted to the requirements of the tube 10 by means of a heterodyne mixer 110 having its input circuits connected to the outputs of amplifier 64 and mixer 108. Mixer 110 is coupled to the control electrode 16 through the adder 78.

In a typical case in which the pilot oscillator 100 operates at a frequency of 31.5 mc./sec., and in which the upper sideband component at 38.5 mc./sec. is selected by the amplifier 64, the output of mixer 106 may have a frequency of 27.61 mc./sec., the output of mixer 108 may have a frequency of 31.5 mc./sec., and the output of mixer 110 may have a frequency of 7 mc./sec. as required by the scanning rate of the phosphor stripes contained on the surface of the image screen of the tube 10.

Figure 4:
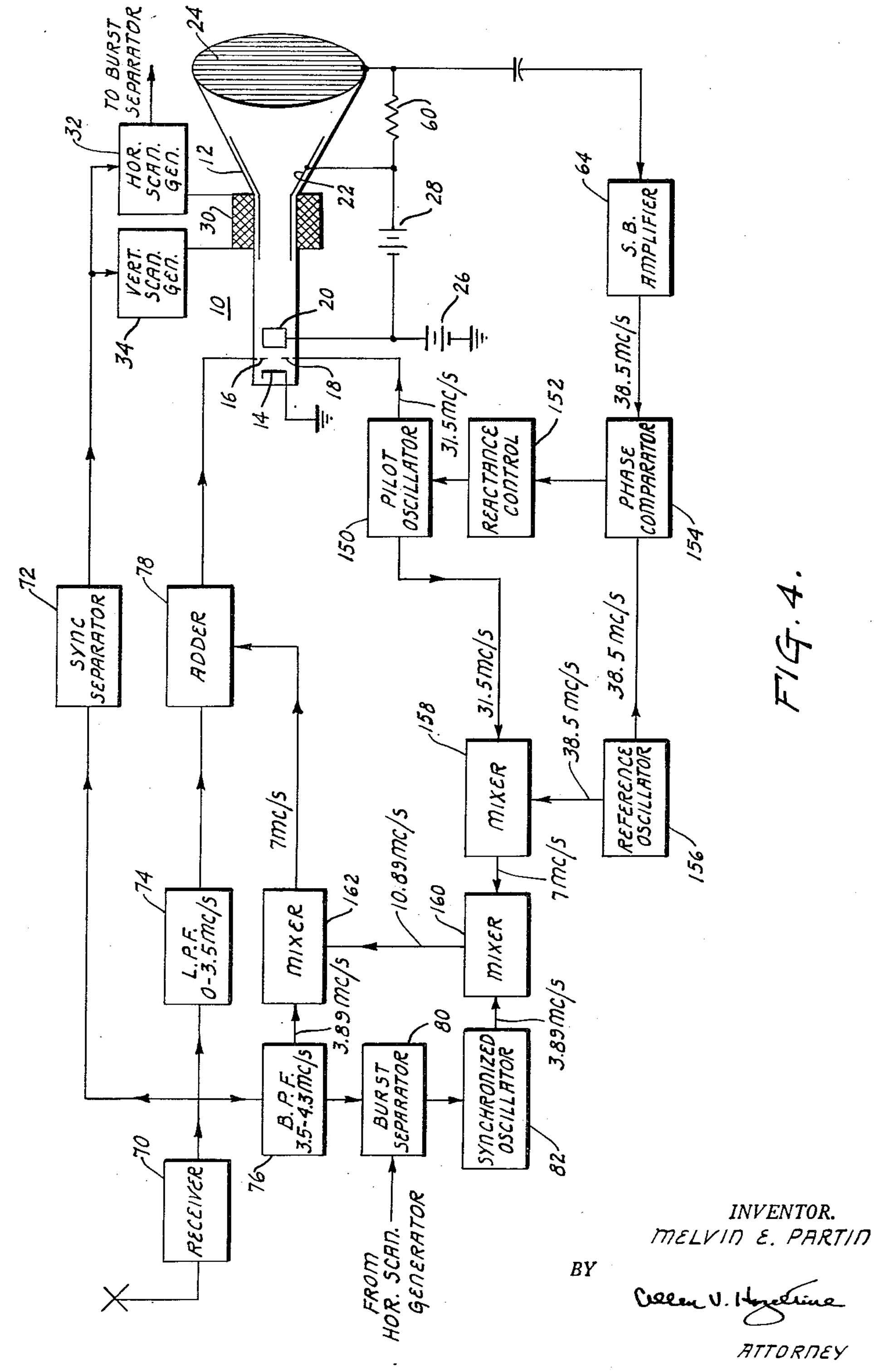
Figure 4 is a block diagram, partly schematic, showing a further embodiment of a cathode-ray tube system in accordance with the invention.

In the system shown in Figure 1, the control signal for varying the frequency of the pilot oscillator 62 in a sense to correct the variations of the frequency of the processed indexing signal is derived from a discriminator type frequency responsive detector 68. When using this type of detector, the frequency of the indexing signal processed by the amplifier 64 can approach the fixed predetermined value of 38.5 mc./sec. only to the extent required to actuate the detector so that the frequency of the processed signal will undergo small but nevertheless perceptible frequency variations as determined by changes in the rate of scanning the indexing regions of the tube 10. In some instances it may be desirable to adjust the frequency of the pilot oscillator more closely so that the frequency of the processed indexing signal is maintained precisely constant. This may be effected by the system shown in Figure 4 wherein the control signal, for varying the frequency of the pilot oscillator to maintain the frequency of the processed indexing signal absolutely constant, is derived from a phase comparison type of detector system hereinafter to be described. As will be noted, many of the components of the system shown in Figure 4 are similar to the components of the system of Figure 1, and accordingly these elements have been indicated by the same reference numerals. In the system shown in Figure 4, the televised image is reproduced by means of a cathode-ray tube 10 similar to those previously described and comprising a cathode 14, beam intensity control electrodes 16 and 18, a focusing electrode 20, an accelerating electrode 22, and a faceplate 24 comprising a beam intercepting screen structure which may be of the form shown in Figure 2. Suitable sources 26 and 28 are provided for energizing the electrodes, the beam intercepting screen structure being connected to the source 28 through a load impedance 60 as previously described. A horizontal and vertical deflection yoke 30, energized by horizontal and vertical scanning generators 32 and 34 respectively, is similarly supplied for deflecting the beam of the cathode-ray tube to form a raster on the beam intercepting structure.

Indexing information is derived from the tube 10 in the form of a sideband component of the intermodulation products produced by a pilot carrier signal which is supplied to the control electrode 18 from a pilot oscillator 150.

Typically the pilot oscillator 150 operates at a nominal frequency of 31.5 mc./sec., and, when the rate of scanning the indexing regions of the tube is 7 million per second, there is produced across the load impedance 60 a carrier wave at a frequency of 31.5 mc./sec. together with upper and lower sideband components having nominal frequencies of 38.5 mc./sec. and 24.5 mc./sec. These sidebands would normally exhibit frequency deviations about their nominal frequency values as determined by variations of the rate at which successive indexing regions are impinged by the beam under the control of the electrode 18 due to non-linearities of the beam deflection and/or non-uniformities of the spacing of the indexing regions. The upper sideband may be selectively derived from the output of the tube 10 by an amplifier 64, as shown, and serves as the control source from which the desired indexing information is obtained.

In accordance with the embodiment of the invention shown in Figure 4, the undesirable phase variations, normally brought about when a signal of varying frequency is supplied to the amplifier 64, are avoided by frequency modulating the pilot oscillator 150 in a sense such as to maintain the frequency of the sideband selected by amplifier 64 at a constant frequency value. For this purpose, the oscillator 150 is constructed as a variable frequency oscillator and is provided with a signal responsive variable reactance control element 152 adapted to vary its frequency about the control value thereof as determined by a control signal applied to the reactance control 152, as previously described in connection with the system shown in Figure 1.

The oscillator 150 and the reactance control 152 may be identical to the corresponding elements 62 and 66 respectively, shown in the system of Figure 1, and operate in the same manner.

For actuating the reactance control 152 there is provided a phase comparator 154 adapted to produce a control signal having an amplitude and sense as determined by the instantaneous phase difference between the phase of the output signal of the amplifier 64 and the phase of a reference signal supplied as a second input to the phase comparator 154. The phase comparator 154 may be of well known form and may consist for example of a bridge, two arms of which are made up of diode elements which are energized in phase opposition by one of the input signals and in the same phase sense by the other of the input signals. In one form the phase comparator may be of the type described by R. H. Dishington in the publication "Proceedings of the I. R. E.," December 1949, at page 1401 et seq.

As a source of a reference signal for the phase comparator 154 there is provided a reference oscillator 156 which, in the specific form of the system shown in Figure 4, operates at a frequency of 38.5 mc./sec. The oscillator 156 may consist of any conventional oscillator which is sufficiently stable to maintain its frequency within the pass band of the amplifier 64 for long time periods. Desirably the oscillator consists of a piezo-electric crystal controlled oscillator of fixed frequency.

The system operates to maintain the frequency of the sideband signal processed by the amplifier 64 at a constant value as determined by the frequency of the oscillator 156. More particularly, a change in the rate at which successive indexing regions of the tube 10 are impinged by the scanning beams, normally tends to increase the frequency of the processed sideband signal amplifier 64 and brings about a change in the phase of the processed signal. This change in phase is detected by the phase comparator 154 and produces a correction signal at the output thereof. The correction signal so produced actuates the reactance control 152 which in turn brings about a compensating change in the ferquency of the oscillator 150 so as to maintain the frequency of the processed sideband signal at a constant value.

While the signal derived from the amplifier 64 is thus maintained at a constant frequency by means of the control system, the oscillator 150 nevertheless undergoes variations in its frequency value as determined by variations of the rate at which successive indexing regions are impinged by the beam. Therefore, as in the case of the system of Figure 1, the indexing information is effectively transferred to the oscillator 62 by the frequency control system, and this indexing information appears in the form of frequency variations of the oscillator frequency about its nominal frequency value. Accordingly a signal derived from the oscillator may be used to establish the desired time phase position of the video wave applied to the cathode-ray tube.

The indexing information contained in the signal from oscillator 150 may be used to establish the time phase position of the video wave in any of several manners. In the arrangement specifically shown in Figure 4 the indexing information at the nominal frequency of 31.5 mc./sec. is adapted to the requirements of the tube 10 and combined with the video information by means of a heterodyne mixing system.

More particularly, for adapting the indexing information to the requirements of the tube 10, an output signal of the oscillator 150 is combined with a signal from the reference oscillator 156 by means of a mixer 158 to produce a heterodyne difference frequency signal which in turn is combined with the received color video wave. It will be noted that this difference frequency signal has a nominal frequency of 7 mc./sec. which corresponds to the average rate at which successive indexing regions—and hence successive color groups—of the screen of the tube 10 are impinged by the scanning beam.

As in the cases of the systems shown in Figures 1 and 3, the color video wave derived from the receiver 70 comprises a brightness component in the form of a wave having a bandwidth of the order of 0–3.5 mc./sec., a chromaticity component in the form of a subcarrier wave having a nominal frequency of approximately 3.89 mc./sec. and a color phase marker signal at a frequency of 3.89 mc./sec. The brightness component is selected by means of a low pass filter 74 and supplied to the control electrode 16 through an adder 78. The chromaticity component of the color phase marker signal may be derived from the output of receiver 70 by means of a bandpass filter 76. The color phase marker signal derived from the output of bandpass filter 76 is supplied to a burst separator 80 which in turn energizes a synchronized oscillator 82, as previously described. The output signal of oscillator 82 at a frequency of 3.89 mc./sec. is combined in a mixer 160 with the indexing signal from the mixer 158 to produce a heterodyne signal at a nominal frequency of 10.89 mc./sec. This signal has a phase reference as established by the color phase marker signal and exhibits frequency variations indicative of the indexing information as determined by the frequency variations of the signal supplied by mixer 158. The output signal of mixer 160 is in turn combined with the chromaticity component of the image signal by means of the mixer 162 to produce a heterodyne signal at a nominal frequency of 7 mc./sec. This latter signal, it will be noted, exhibits amplitude and phase variations as determined by the chromaticity component of the video wave, has a phase reference as established by the color phase marker signal, and exhibits frequency variations as determined by the indexing information originally derived from the pilot oscillator 150. The signal so produced is supplied to the control electrode 16 of tube 10 by being applied as a second input to the adder 78.

The mixers 158, 160 and 162 may be similar to those previously described in connection with the systems shown in Figures 1 and 3, due consideration being given to the frequencies of the signals applied to the inputs thereof and derived from the outputs thereof.

While the invention has been described with reference to the use of color image producing tube 10 having two individual beams which are deflected in synchronism and are individually controlled in intensity as described in my co-pending application above referred to, it is apparent that the invention is equally applicable to cathode-ray tube systems having a single beam, in which case all of the signals supplied to the image reproducing tube may be applied to the same control electrode to vary correspondingly and simultaneously the intensity of the beam.

While I have described my invention by means of specific examples and in specific embodiments, I do not wish to be limited thereto for obvious modifications will occur to those skilled in the art without departing from the spirit and scope of the invention.

What I claim is:

1. An electrical system comprising a cathode-ray tube having a source of charged particles and a beam intercepting member, means for varying the flow of said charged particles from said source, said beam intercepting member comprising a plurality of first elemental areas having a first given response characteristic upon impingement by said charged particles, and comprising second elemental areas having a second given response characteristic upon impingement by said charged particles different from the response characteristic of said first elemental areas, said second elemental areas being arranged in a geometrical configuration indicative of the geometrical configuration of said first areas, means for scanning said charged particles in beam formation across said first and second elemental areas at a given nominal rate thereby to energize said first and second areas, means for varying the flow of said charged particles thereby to produce variations of the response of said first areas, means for further varying the flow of said charged particles at a given nominal rate, means to derive from said beam intercepting member a signal quantity determined by the response characteristic of said second elemental areas and having a nominal frequency determined by the said rate of further varying the flow of said charged particles and by the rate of scanning said second elemental areas, and means responsive to said signal quantity to angle modulate the said given nominal rate of further varying the flow of said charged particles.

2. A cathode-ray tube system as claimed in claim 1 wherein said means responsive to said signal quantity to angle modulate the said given nominal rate of further varying the flow of said charged particles comprises a frequency discriminator for producing a control quantity having amplitude variations as determined by variations of the frequency of said signal quantity from the nominal frequency value thereof.

3. A cathode-ray tube system as claimed in claim 1 wherein said means responsive to said signal quantity to angle modulate the said given nominal rate of further varying the flow of said charged particles comprises a reference frequency signal source and a phase comparator system energized by said reference signal source and by said signal quantity, said phase comparator producing a control quantity having amplitude variations as determined by variations of the phase relationship between said reference signal and said signal quantity.

4. A cathode-ray tube system as claimed in claim 1 wherein said means to angle modulate the said given nominal rate of further varying the flow of said charged particles comprises means to frequency modulate said given nominal rate in a sense such as to maintain the frequency of said signal quantity substantially constant.

5. A cathode-ray tube system as claimed in claim 1 wherein said means to angle modulate the said given nominal rate of further varying the flow of said charged particles comprises means to phase modulate the rate of further varying the flow of said charged particles.

6. A cathode-ray tube system as claimed in claim 1 wherein said means for varying the flow of said charged particles, thereby to produce variations of the response of said first areas, comprises means to apply to said flow varying means a wave of given nominal frequency value, and further comprising means responsive to said signal quantity for varying the relation between the phase of said wave and the scanning position of said beam of charged particles.

7. A cathode-ray tube system comprising a cathode-ray tube having a source of electrons, means for controlling the intensity of electron flow from said source and an electron beam intercepting member, said beam intercepting member comprising a plurality of first elemental areas having a first given response characteristic upon electron impingement, and comprising second elemental areas having a second given response characteristic upon electron impingement different from the response characteristics of said first elemental areas, said second elemental areas being arranged in a geometrical configuration indicative of the geometrical configuration of said first areas, means for scanning said electron in beam formation across said first and second elemental areas at a given nominal rate thereby to energize said first and second areas, means for applying to said control means a first wave having variations indicative of desired variations of the response of said first areas, means for applying to said control means a second wave having a given nominal frequency value, means for deriving from said beam intercepting member a signal quantity determined by the response characteristic of said second elemental areas and having a nominal frequency determined by the frequency of said second wave and by the rate of scanning said second elemental areas, and means responsive to said signal quantity to angle modulate the said second wave.

8. A cathode-ray tube system as claimed in claim 7 wherein said signal quantity comprises a sideband component of the intermodulation products of said second wave and the rate of scanning said second elemental areas, wherein said signal quantity deriving means comprises means for selectively transmitting said sideband component to the exclusion of other components of said intermodulation products, wherein said sideband component undergoes frequency variations relative to the frequency of said second wave as determined by variations of the rate of scanning said second elemental areas, and wherein said angle modulating means comprises means responsive to said transmitted sideband component for angle modulating said second wave.

9. A cathode-ray tube system as claimed in claim 8 wherein said angle modulating means comprises a frequency discriminator for producing a control quantity having amplitude variations as determined by variations of the frequency of said transmitted sideband component, and means responsive to said control quantity for angle modulating said second wave.

10. A cathode-ray tube system as claimed in claim 8 wherein said angle modulating means comprises a reference frequency signal source, a phase detector system energized by said reference signal source and by said transmitted sideband component for producing a control quantity having amplitude variations as determined by variations of the phase relationship between said reference signal and said transmitted sideband component, and means responsive to said control quantity for angle modulating said second wave.

11. A cathode-ray tube system as claimed in claim 8 wherein said transmitting means for said sideband component imparts phase variations to the transmitted sideband component as determined by variations of the frequency of the sideband component about its nominal frequency value, and wherein said angle modulating means comprises means to frequency modulate said second wave in a sense such as to maintain the frequency of said sideband component at a substantially constant value.

12. A cathode-ray tube system as claimed in claim 11 further comprising means responsive to said frequency modulated second wave for varying the relationship between the phase of said first wave and the position of said scanning beam.

13. A cathode-ray tube system as claimed in claim 8 wherein said transmitting means for said sideband component imparts phase variations to the transmitted sideband component as determined by variations of the frequency of the sideband component about its nominal frequency value, and wherein said angle modulating means comprises means for phase modulating said second wave in a sense such as to cancel the phase variations imparted to said sideband component by said transmission means.

14. A cathode-ray tube system as claimed in claim 13 further comprising means responsive to said transmitted sideband component for varying the relationship between the phase of said first wave and the position of said scanning beam.

15. A cathode-ray tube system for reproducing a color television image as defined by a color video wave indicative of visual aspects of said image; said system comprising a cathode-ray tube having an electron beam intercepting member, means to generate electrons and to direct the same in beam formation towards said beam intercepting member and means to vary the flow of electrons from said generating means, said intercepting member comprising first portions, each comprising a plurality of stripes of fluorescent material arranged in substantially parallel relationship, said stripes being adapted to produce light of different colors in response to electron impingement; and said member further comprising second portions spaced apart substantially parallel to said fluorescent stripes and having a response characteristic upon electron impingement different from the response characteristic of said first portions; means to scan said electrons in beam formation across said beam intercepting member at a given nominal rate thereby to energize said first and second portions; means for applying said color video wave to said electron flow varying means thereby to produce variations of the response of said first portions; a source of a first signal coupled to said tube to vary the flow of electrons from said generating means at a first nominal frequency value; means for deriving from said intercepting member a second signal having a carrier frequency determined by the frequency of said first signal and having a sideband component, said sideband component having a nominal frequency value determined by the rate of scanning said second component and undergoing frequency variations relative to the frequency of said first signal as determined by variations of the rate of scanning said second components; frequency selective means energized by said second signal and adapted to selectively transmit said sideband component and attenuate other components of said second signal, said frequency selective means imparting to the said transmitted sideband component phase variations as determined by the absolute frequency variations of the said transmitted component about its nominal frequency value; frequency sensitive detecting means energized by said transmitted sideband component and adapted to produce a control signal having amplitude variations as determined by the absolute frequency variations of the said transmitted component about its nominal frequency value; means responsive to said control signal for angle modulating said first signal; means to derive a second control signal having frequency variations as determined by the frequency deviations of said sideband component relative to the frequency of said first signal; and means responsive to said second control signal for varying the relationship between the phase of said color video wave and the position of said scanning beam.

16. A cathode-ray tube system as claimed in claim 15 wherein said source of a first signal is a variable frequency source, wherein said means for angle modulating said first signal comprises means for frequency modulating said first signal in a sense such as to maintain the absolute frequency of said sideband component at a substantially constant value, and wherein said second control signal is a signal derived from said source.

17. A cathode-ray tube system as claimed in claim 15 wherein said source of a first signal is a fixed frequency source, wherein said means for angle modulating said first signal comprising means for phase modulating said signal in a sense such as to compensate the said phase variations imparted to said sideband component by said frequency selective transmission means, and wherein said second control signal is a signal derived from said transmitted sideband component.

18. A cathode-ray tube system as claimed in claim 17 wherein said second control signal has a value such as to produce phase modulation of said first signal substantially completely compensating the said phase variations of said sideband component imparted by said frequency selective transmission means.

19. A cathode-ray tube system as claimed in claim 17 wherein said second control signal has a value such as to produce phase modulation of said first signal to an extent overcompensating the said phase variations of said sideband component imparted by said frequency selective transmission means.

20. A cathode-ray tube system for reproducing a color television image as defined by a color video wave indicative of visual aspects of said image; said system comprising a cathode-ray tube having an electron beam intercepting member, means to generate electrons and to direct the same in beam formation towards said beam intercepting member and means to vary the flow of electrons from said generating means, said intercepting member comprising first portions, each comprising a plurality of stripes of fluorescent material arranged in substantially parallel relationship, said stripes being adapted to produce light of different colors in response to electron impingement, and said member further comprising second portions spaced apart substantially parallel to said fluorescent stripes and having a response characteristic upon electron impingement different from the response characteristic of said first portions; means to scan said electrons in beam formation across said beam intercepting member at a given nominal rate thereby to energize said first and second portions; means for applying said color video wave to said electron flow varying means thereby to produce variations of the response of said first portions; a source of a first signal coupled to said tube to vary the flow of electrons from said generating means at a first nominal frequency value; means for deriving from said intercepting member a second signal having a carrier frequency determined by the frequency of said first signal and having a sideband component, said sideband component having a nominal frequency value determined by the rate of scanning said second component and undergoing frequency variations relative to the frequency of said first signal as determined by variations of the rate of scanning said second components; frequency selective means energized by said second signal and adapted to selectively transmit said sideband component and attenuate other components of said second signal, said frequency selective means imparting to the said transmitted sideband component phase variations as determined by the absolute frequency variations of the said transmitted component about its nominal frequency value; a source of a reference signal having a frequency substantially equal to the nominal frequency of said transmitted component; a phase comparator system energized by said reference signal and by said transmitted sideband component and adapted to produce a control signal having amplitude variations as determined by variations of the phase relationship between said reference signal and said transmitted sideband component; means responsive to said control signal for frequency modulating said first signal in a sense such as to maintain the absolute frequency of said sideband component at a substantially constant value; means for deriving from said frequency modulated first signal a second control signal having frequency variations as determined by the frequency variations of said first signal; and means responsive to said second control signal for varying the relationship between the phase of said color video wave and the position of said scanning beam.

References Cited in the file of this patent

UNITED STATES PATENTS

| | | |
|---|---|---|
| 2,617,876 | Rose | Nov. 11, 1952 |
| 2,634,325 | Bond | Apr. 7, 1953 |
| 2,634,326 | Goodrich | Apr. 7, 1953 |